(12) United States Patent
Ballard et al.

(10) Patent No.: US 9,250,660 B2
(45) Date of Patent: Feb. 2, 2016

(54) "HOME" BUTTON WITH INTEGRATED USER BIOMETRIC SENSING AND VERIFICATION SYSTEM FOR MOBILE DEVICE

(71) Applicants: Claudio R. Ballard, Fort Lauderdale, FL (US); Sandy Fliderman, Albertson, NY (US)

(72) Inventors: Claudio R. Ballard, Fort Lauderdale, FL (US); Sandy Fliderman, Albertson, NY (US)

(73) Assignee: LaserLock Technologies, Inc., Bala Cynwyd, PA (US)

( * ) Notice: Subject to any disclaimer, the term of this patent is extended or adjusted under 35 U.S.C. 154(b) by 0 days.

(21) Appl. No.: 13/910,482

(22) Filed: Jun. 5, 2013

(65) Prior Publication Data
US 2014/0140587 A1      May 22, 2014

Related U.S. Application Data

(60) Provisional application No. 61/726,484, filed on Nov. 14, 2012.

(51) Int. Cl.
  *G06F 1/16*   (2006.01)
  *G06F 21/32*  (2013.01)
  *G06K 9/00*   (2006.01)

(52) U.S. Cl.
  CPC ............... *G06F 1/1686* (2013.01); *G06F 21/32* (2013.01); *G06K 9/0004* (2013.01)

(58) Field of Classification Search
  CPC ...... G06F 21/32; G06F 1/1686; G06K 9/0004
  See application file for complete search history.

(56) References Cited

U.S. PATENT DOCUMENTS

| | | |
|---|---|---|
| 3,259,684 A | 7/1966 | Wakefield |
| 3,795,760 A | 3/1974 | Raw et al. |
| 3,908,959 A | 9/1975 | Fichtner |
| 4,733,361 A | 3/1988 | Krieser et al. |
| 4,845,416 A | 7/1989 | Scholl et al. |
| 5,149,915 A | 9/1992 | Brunker et al. |
| 5,156,198 A | 10/1992 | Hall |
| 5,195,092 A | 3/1993 | Wilson et al. |
| 5,416,777 A | 5/1995 | Kirkham |
| 5,519,588 A | 5/1996 | Sobeck et al. |
| 5,566,091 A | 10/1996 | Schricker et al. |
| 5,652,893 A | 7/1997 | Ben-Meir et al. |
| 5,704,586 A | 1/1998 | Nielsen |
| 5,953,844 A | 9/1999 | Harling et al. |
| 6,011,548 A | 1/2000 | Thacker |
| 6,044,857 A | 4/2000 | Stege |

(Continued)

*Primary Examiner* — Utpal Shah
*Assistant Examiner* — Pinalben Patel
(74) *Attorney, Agent, or Firm* — Morrison & Foerster LLP

(57) ABSTRACT

A mobile device having a HOME button with integrated user biometric sensing comprises a casing, a touchscreen, a HOME button and a camera/scanner module. The touchscreen is mounted on the casing and simultaneously acts as a display panel and a touch-sensitive digitizing input pad. The HOME button is mounted on the casing, and at least a portion of the HOME button is formed of an optically transparent material forming an aperture or lens for transmitting optical images through the HOME button. The camera/scanner module is disposed below the HOME button adjacent the aperture, and includes a housing, a lens, a photo sensor and signal wires which operatively connect the scanner/camera module to sensing/security circuitry disposed within the casing. When a user presses the HOME button with a fingertip, the lens array focuses an image of a fingerprint from the top surface of the HOME button onto the photo sensor.

9 Claims, 2 Drawing Sheets

(56) References Cited

U.S. PATENT DOCUMENTS

| | | |
|---|---|---|
| 6,182,807 B1 | 2/2001 | Saito et al. |
| 6,262,982 B1 | 7/2001 | Donahue et al. |
| 6,308,205 B1 | 10/2001 | Carcerano et al. |
| 6,311,106 B1 | 10/2001 | Dupont |
| 6,386,229 B1 | 5/2002 | Morikawa et al. |
| 6,438,472 B1 | 8/2002 | Tano et al. |
| 6,481,140 B1 | 11/2002 | Marshall |
| 6,487,804 B1 | 12/2002 | Petrella, Jr. |
| 6,533,466 B1 | 3/2003 | Smith |
| 6,564,661 B2 | 5/2003 | Dejonge |
| 6,609,051 B2 | 8/2003 | Fiechter et al. |
| 6,693,523 B1 | 2/2004 | Abel et al. |
| 6,837,602 B1 | 1/2005 | Lee |
| 6,859,539 B1 | 2/2005 | Maeda |
| 7,004,787 B2 | 2/2006 | Milan |
| 7,038,192 B2 | 5/2006 | Lu et al. |
| 7,110,868 B2 | 9/2006 | An |
| 7,270,263 B2 | 9/2007 | Rosenblatt |
| 7,375,285 B2 | 5/2008 | Chiang |
| 7,377,344 B2 | 5/2008 | Barske |
| 7,392,122 B2 | 6/2008 | Pillar et al. |
| 7,441,362 B1 | 10/2008 | Kley |
| 7,483,952 B2 | 1/2009 | Light et al. |
| 7,506,468 B2 | 3/2009 | Farrell et al. |
| 7,519,558 B2 | 4/2009 | Ballard et al. |
| 7,540,638 B2 | 6/2009 | Dassanayake et al. |
| 7,620,212 B1 | 11/2009 | Allen et al. |
| 7,703,961 B2 | 4/2010 | Yatsuda et al. |
| 7,725,732 B1 | 5/2010 | Ballard |
| 7,740,501 B2 | 6/2010 | Ballard et al. |
| 7,747,739 B2 | 6/2010 | Bridges et al. |
| 7,856,158 B2 | 12/2010 | Ballard |
| 7,886,471 B2 | 2/2011 | Glock |
| 7,921,588 B2 | 4/2011 | Brown et al. |
| 7,940,673 B2 | 5/2011 | Ballard et al. |
| 8,089,228 B2 | 1/2012 | Ballard |
| 8,111,145 B2 | 2/2012 | Ballard |
| 8,125,346 B2 | 2/2012 | Ballard et al. |
| 8,254,734 B2 | 8/2012 | Ballard |
| 8,303,337 B2 | 11/2012 | Ballard et al. |
| 8,342,478 B1 | 1/2013 | Cordray et al. |
| 8,526,311 B2 | 9/2013 | Ballard et al. |
| 8,604,906 B1 * | 12/2013 | Halferty et al. ............... 340/5.83 |
| 8,850,733 B1 | 10/2014 | Oster |
| 2001/0034671 A1 | 10/2001 | Luke et al. |
| 2002/0034301 A1 | 3/2002 | Andersson |
| 2002/0112390 A1 | 8/2002 | Harling et al. |
| 2002/0180579 A1 | 12/2002 | Nagaoka et al. |
| 2003/0114965 A1 | 6/2003 | Fiechter et al. |
| 2003/0120397 A1 | 6/2003 | Bergmann et al. |
| 2003/0158638 A1 | 8/2003 | Yakes et al. |
| 2003/0191564 A1 | 10/2003 | Haugse et al. |
| 2003/0216889 A1 | 11/2003 | Marko et al. |
| 2004/0019413 A1 | 1/2004 | Bonilla |
| 2004/0031180 A1 | 2/2004 | Ivanov |
| 2004/0043753 A1 | 3/2004 | Wake et al. |
| 2004/0159289 A1 | 8/2004 | Taylor et al. |
| 2004/0202007 A1 | 10/2004 | Yagi et al. |
| 2004/0211246 A1 | 10/2004 | Han et al. |
| 2004/0252867 A1 * | 12/2004 | Lan et al. ...................... 382/124 |
| 2005/0107928 A1 | 5/2005 | Mueller |
| 2005/0109145 A1 | 5/2005 | Levin et al. |
| 2005/0132194 A1 | 6/2005 | Ward |
| 2005/0137796 A1 | 6/2005 | Gumpinger |
| 2005/0155043 A1 | 7/2005 | Schulz et al. |
| 2005/0190045 A1 | 9/2005 | Lesesky et al. |
| 2005/0240484 A1 | 10/2005 | Yan et al. |
| 2006/0044825 A1 | 3/2006 | Sa |
| 2006/0200781 A1 | 9/2006 | Obradovich |
| 2007/0001830 A1 | 1/2007 | Dagci et al. |
| 2007/0011227 A1 | 1/2007 | Johnson |
| 2007/0030137 A1 | 2/2007 | Masters et al. |
| 2007/0204039 A1 | 8/2007 | Inamdar |
| 2007/0252681 A1 | 11/2007 | Costelle et al. |
| 2008/0060861 A1 | 3/2008 | Baur et al. |
| 2008/0257428 A1 | 10/2008 | Scholz et al. |
| 2009/0040029 A1 | 2/2009 | Bridges et al. |
| 2009/0051522 A1 | 2/2009 | Perkins |
| 2009/0091291 A1 | 4/2009 | Woody et al. |
| 2009/0200988 A1 | 8/2009 | Bridges et al. |
| 2009/0204510 A1 | 8/2009 | Hwang |
| 2009/0272313 A1 | 11/2009 | Ballard et al. |
| 2009/0273282 A1 | 11/2009 | Ballard et al. |
| 2009/0273942 A1 | 11/2009 | Ballard et al. |
| 2009/0289757 A1 | 11/2009 | Ballard |
| 2010/0076673 A1 | 3/2010 | Saloka |
| 2010/0082277 A1 | 4/2010 | Ballard |
| 2010/0126401 A1 | 5/2010 | Kokkinis |
| 2010/0155635 A1 | 6/2010 | Fima |
| 2010/0208915 A1 | 8/2010 | Lipp |
| 2011/0010269 A1 | 1/2011 | Ballard |
| 2011/0202205 A1 | 8/2011 | Pepitone et al. |
| 2011/0320849 A1 | 12/2011 | Cochran et al. |
| 2012/0083958 A1 | 4/2012 | Ballard |
| 2012/0179620 A1 | 7/2012 | Fliderman et al. |
| 2012/0204032 A1 | 8/2012 | Wilkins et al. |
| 2012/0321149 A1 * | 12/2012 | Carver ................. G06K 9/0004 382/124 |
| 2013/0058012 A1 | 3/2013 | Ballard |
| 2013/0173940 A1 | 7/2013 | Sargent et al. |
| 2013/0231794 A1 | 9/2013 | Fick et al. |
| 2014/0020244 A1 | 1/2014 | Carlson et al. |
| 2014/0133715 A1 | 5/2014 | Ballard et al. |
| 2014/0137195 A1 | 5/2014 | Ballard et al. |
| 2014/0140587 A1 | 5/2014 | Ballard et al. |
| 2014/0166694 A1 | 6/2014 | Otto |
| 2014/0193140 A1 | 7/2014 | Fliderman et al. |
| 2014/0195974 A1 | 7/2014 | Ballard et al. |
| 2014/0196143 A1 | 7/2014 | Fliderman et al. |
| 2014/0205196 A1 | 7/2014 | Freedman et al. |
| 2014/0209825 A1 | 7/2014 | Fick et al. |
| 2014/0222976 A1 | 8/2014 | Ballard et al. |
| 2014/0243081 A1 | 8/2014 | Fliderman |
| 2014/0244051 A1 | 8/2014 | Rollins et al. |
| 2014/0303808 A1 | 10/2014 | Sargent |
| 2014/0306837 A1 | 10/2014 | Hauck, III |
| 2015/0040453 A1 | 2/2015 | Ballard et al. |

* cited by examiner

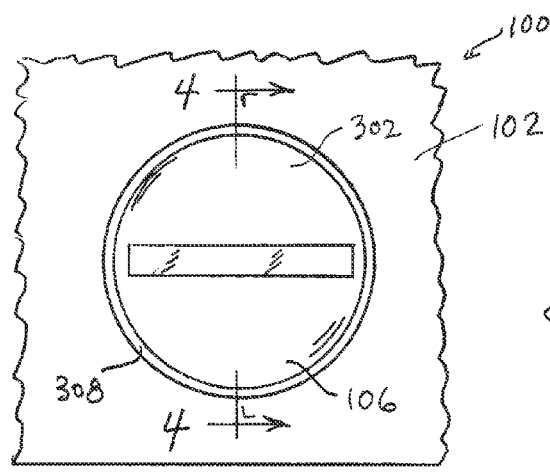
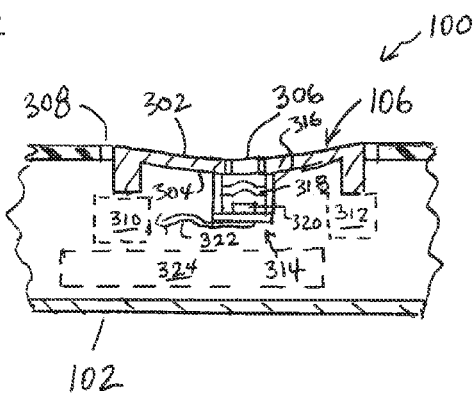
FIG. 3
FIG. 4
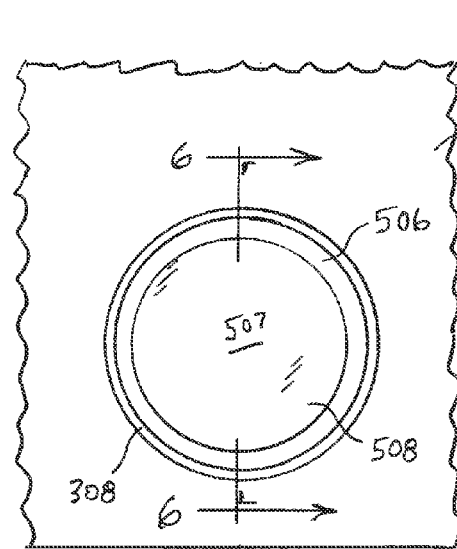
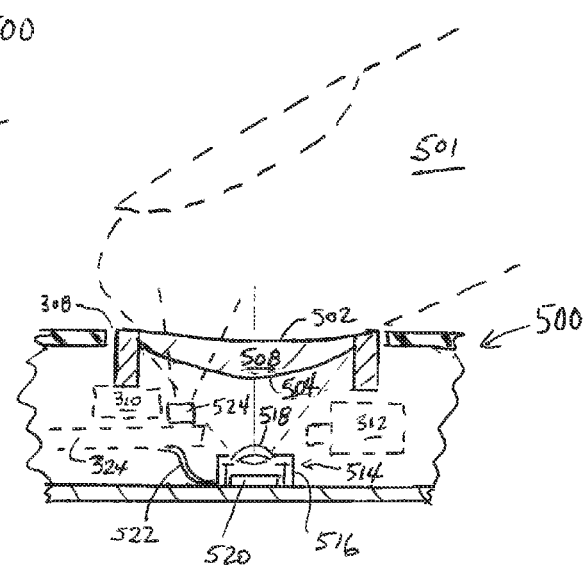
FIG. 5
FIG. 6

"HOME" BUTTON WITH INTEGRATED USER BIOMETRIC SENSING AND VERIFICATION SYSTEM FOR MOBILE DEVICE

CROSS-REFERENCE TO RELATED APPLICATIONS

This application claims benefit of U.S. Provisional Application No. 61/726,484,filed Nov. 14, 2012,entitled "HOME" BUTTON WITH INTEGRATED USER BIOMETRIC SENSING AND VERIFICATION SYSTEM FOR MOBILE DEVICE, the specification of which is incorporated herein in its entirety.

TECHNICAL FIELD

The following disclosure relates to mobile devices having a touchscreen and a physical "HOME" button, and more particularly, to devices wherein the HOME button includes integrated user biometric sensing.

BACKGROUND

Modern mobile devices such as "smartphones," "tablets," "handhelds," "e-readers" and the like are characterized by the use of touchscreens that serve as both input devices and display devices. Consumers increasingly favor mobile devices with larger touchscreens but, at the same time, with the smallest possible overall device size (i.e., form factor). These conflicting demands limit the "real estate" space available for the placement of new peripheral devices on such mobile devices. A need therefore exists, for peripheral devices that can be incorporated into the form factor of existing mobile devices to provide additional capabilities without reducing the user experience.

Additionally, as the use of mobile devices by the public grows, so does the need for improved security to prevent unauthorized access to secured content on the device and/or secure accounts accessible via the device. Although the use of basic security measures such as user IDs and passwords is common, these measures are often less secure and less convenient to use than biometric security measures. A need therefore exists, for user biometric sensing on mobile devices and verification systems that may be easily used to control access to the device.

SUMMARY

In one aspect thereof, this invention embeds a biometric swipe or full optical fingerprint sensor/scanner into what is typically referred to on modern day mobile devices as the "HOME" button. For the purpose of clarity we will refer to such a HOME button as it exists on current (i.e., from 2007 to 2012) Apple® mobile devices such as iPhone™ brand smartphones, iPad™ brand tablets and iPod Touch™ brand handhelds, with an understanding that similar "HOME" buttons exist on most mobile devices by other manufacturers, although they may be represented with square or rectangle buttons in various locations on the device. This embedded biometric sensor/scanner collects a fingerprint image at the time a user presses or swipes the "HOME" button on the mobile device. An associated security system may then use the sensed biometric information to verify the authenticity of the user and make available on an "assigned rights" basis access to some or all secured content including, files, contacts, images, photos, user names, passwords, etc., that have been administratively assigned with a local application and/or a remote agent. Technology disclosed in U.S. Pat. No. 7,519,558 to Ballard et al. may be utilized in the security system. U.S. Pat. No. 7,519,558,including all specification, description, figures and claims, is hereby incorporated by reference.

In another aspect, the sensor/scanner includes a prism so greater finger surface area can be captured with less, little or no movement of the finger once presented on the HOME button.

In another aspect, a HOME button allows for and/or promotes finger-swipe movement as to utilize sensor/scanner technology embedded within the HOME button. Conventional sensor/scanner technology may be utilized in some embodiments, whereas new sensor/scanner technology may be used in other embodiments.

In another aspect, a touchscreen-equipped mobile device has a HOME button with integrated user biometric sensing in accordance with the disclosure herein.

In another aspect, a mobile device having a HOME button with integrated user biometric sensing comprises a casing and a touchscreen mounted on a front side of the casing, the touchscreen acting as a display panel and, at the same time, acting as a touch-sensitive, digitizing input pad. A HOME button is mounted on the front side of the casing, at least a portion of the HOME button being formed of an optically transparent material so as to form an aperture or lens for transmitting optical images through the HOME button from a top surface to the bottom surface. A camera/scanner module is disposed below the bottom surface of the HOME button adjacent the aperture, the camera/scanner module including a housing, a lens, a photo sensor and signal wires which operatively connect the scanner/camera module to sensing/security circuitry disposed within the casing. When a user presses the top surface of the HOME button with a fingertip, the lens array focuses an image of a fingerprint of the fingertip from the top surface of the HOME button onto the photo sensor.

In yet another aspect, the mobile device is a smartphone.

In yet another aspect, the mobile device is a tablet device or table computer.

In yet another aspect, the mobile device is a handheld device.

In yet another aspect, after the lens array focuses an image of a fingerprint of the fingertip from the top surface of the HOME button onto the photo sensor, the photo sensor sends signals representative of the user's biometric data to the sensing/security circuitry of the mobile device.

In yet another aspect, after the photo sensor sends signals representative of the user's biometric data to the sensing/security circuitry of the mobile device, the mobile device compares the user's biometric data to previously stored biometric data corresponding to on or more authorized users of the mobile device and/or accounts accessible via the mobile device.

In yet another aspect, the comparison of the user's biometric data to previously stored biometric data corresponding to on or more authorized users is performed entirely within the mobile device.

In yet another aspect, the comparison of the user's biometric data to previously stored biometric data corresponding to on or more authorized users is performed at least partially via communication with an external networked device.

In yet another aspect, the external networked device is a security server.

BRIEF DESCRIPTION OF THE DRAWINGS

For a more complete understanding, reference is now made to the following description taken in conjunction with the accompanying Drawings in which:

FIG. 3 is an enlarged view of the HOME button area of the mobile device of FIG. 1;

FIG. 4 is a cross-sectional side view of the mobile device of FIGS. 1-3 taken along line 4-4 of FIG. 3;

FIG. 5 is an enlarged view of the HOME button area of another mobile device in accordance with another embodiment; and FIG. 6 is a cross-sectional side view of the mobile device of FIG. 5 taken along line 6-6 of FIG. 5.

DETAILED DESCRIPTION

For purposes of this application, the term "HOME button" means a physical button located on the face of a touchscreen-equipped mobile device (e.g., smartphone, tablet, handheld, tablet computer or similar device) that is actually moved by pressing (i.e., with a fingertip) to cause the device to navigate to the home screen of the user interface. The HOME button is not the same as the "HOME key" (commonly found on computer keyboards), which is used in text editing applications to return the cursor to the beginning of the line where the cursor is located. By way of example, many Apple® mobile devices (e.g., iPhone™ brand smartphones, iPad™ brand tablets and some iPod Touch™ brand handhelds) released from at least 2007 to 2012 use a HOME button disposed on the front face of the device just below the active portion of the touchscreen.

Figure 1:
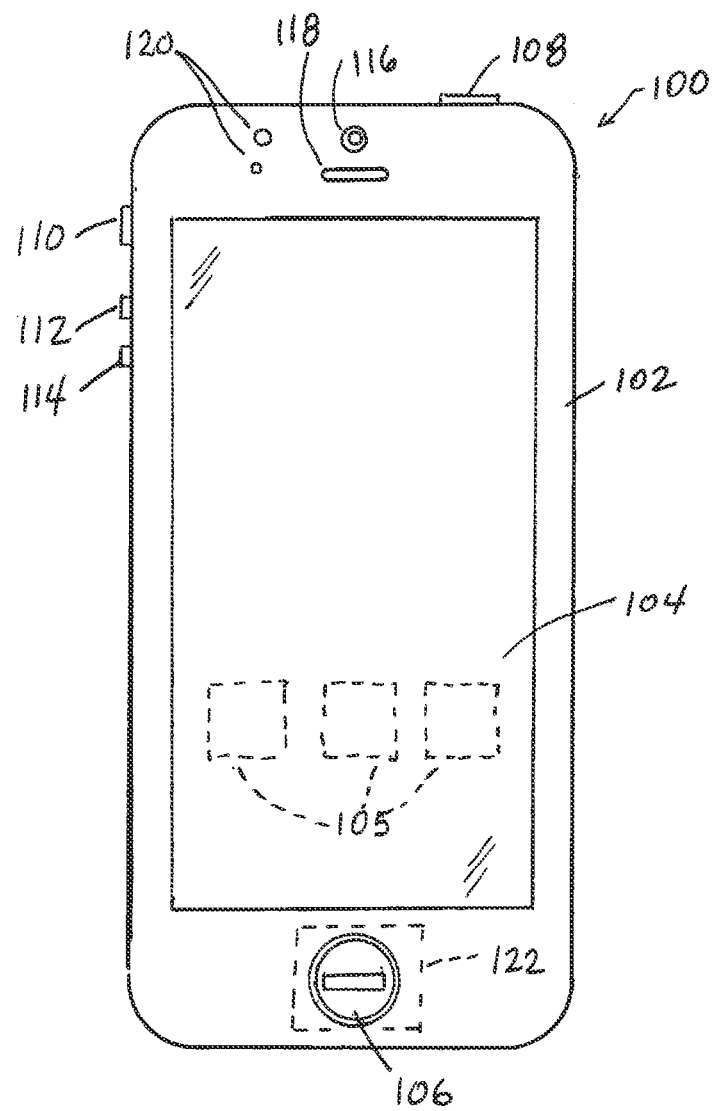
FIG. 1 is a front view of a mobile device having a HOME button with integrated user biometric sensing in accordance with one embodiment.
Figure 2:
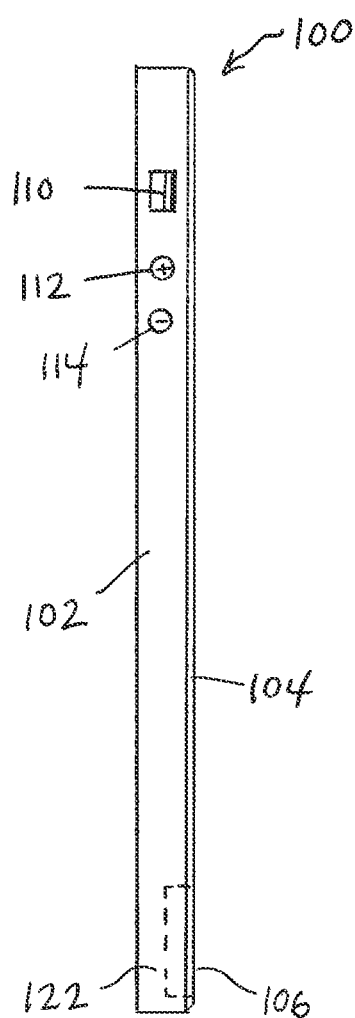
FIG. 2 is a side view of the mobile device of FIG. 1.

Referring to FIGS. 1 and 2, there is illustrated a mobile device having a HOME button with integrated user biometric sensing in accordance with one embodiment. In this embodiment, the mobile device is a smartphone; however, in other embodiments, the mobile device may be a tablet, handheld or similar device having a touchscreen and HOME button. The mobile device 100 includes a casing 102 and a touchscreen 104 mounted on the front side of the casing. The touchscreen 104 serves dual purposes, acting as a display panel for displaying icons 105, text and graphic content (not shown) and, at the same time, acting as a touch-sensitive, digitizing input pad. A HOME button 106 is mounted on the front side of the casing 102. In some embodiments, the HOME button is mounted through the touchscreen 104 or through the glass plate associated with the touchscreen, while in other embodiments, the HOME button is mounted directly on or through the front side of the casing.

The mobile device 100 may further include a sleep/wake button 108, a ring/silent switch 110, a volume UP button 112, a volume DOWN button 114, one or more cameras 116, one or more speakers 118 and/or one or more sensors (e.g., proximity sensors, light sensors, etc.). The various components of the mobile device 100 are operatively connected to internal components (not shown), which may include circuit boards, processors, memory devices, cellular, Wi-Fi and/or Bluetooth transceivers and/or batteries. Except as otherwise described herein, these components and their functional interconnections are conventional In some embodiments, the components used for integrated user biometric sensing are located in the HOME button region 122 of the casing; however, in other embodiments, the sensing components may be disposed in other portions of the casing as well.

Referring now to FIGS. 3 and 4, there is illustrated an enlarged view of the HOME button region of the mobile device of FIGS. 1 and 2. The HOME button 106 includes a top surface 302 and a bottom surface 304. In the illustrated embodiment, the top surface 302 has an upwardly concave curved contour; however, other curved contours, or a flat contour may be used for the top surface of the HOME button in other embodiments. At least a portion of the HOME button 106 is formed of an optically transparent material so as to form an aperture 306 for transmitting optical images through the HOME button. The optically transparent material may be a glass material, plastic material or other transparent substance. In the illustrated embodiment, the aperture 306 is rectangular in shape (viewed from above) and extends across the center of the HOME button to a width of about 85% of the width of the HOME button. In other embodiments, the aperture 306 is rectangular and extends across the HOME button to a width within the range from 10% to 100% of the width of the HOME button. In still other embodiments, the aperture 306 may be another shape including, but not limited to, square, round, oval, triangular or irregular.

In the illustrated embodiment, the HOME button 106 is separated from the casing 102 by a small gap 308 to allow the button to move relative to the casing; however, in other embodiments, the HOME button may be connected to the casing by a flexible continuous membrane (not shown) or other structure that allows the HOME button to move relative to the casing. The HOME button 106 is operatively connected to one or more spring element(s) 310 and one or more switch element(s) 312 disposed within the HOME button region 122 of the casing 102 to allow the HOME button to be pressed and activate functions of the mobile device 100.

A camera/scanner module 314 is disposed below the bottom surface 304 of the HOME button 106 adjacent the aperture 306 to perform user biometric sensing. In the illustrated embodiment, the camera/scanner module 314 is attached to the HOME button 106 so as to move with the button; however, in other embodiments the camera/scanner may be mounted to another part of the casing 102. The camera/scanner module 314 includes a housing 316, a lens array 318, a photo sensor 320 and signal wires 322, which operatively connect the scanner/camera module to sensing/security circuitry 324 disposed within the casing 102 of the mobile device 100. The housing 316 and lens array 318 of the camera/scanner module 314 will be configured in accordance with the shape of the aperture 306. The lens array 318 may include one or more lenses as necessary to focus the image received (via the aperture 306) from the top surface 304 of the HOME button onto the photo sensor 320. The lenses of the lens array may include conventional lenses of various configurations, spherical lenses, aspheric lenses, Fresnel lenses, prisms, beam-splitters, filters, polarizers and/or other optical devices useful for bending and/or focusing light. The photo sensor 320 may be a CCD light sensor, a CMOS light sensor, or other type of light sensor.

In operation of the system according to one embodiment, the user presses the HOME button 106 with his/her finger 501 (see FIG. 6), thus presenting biometric data unique to that user (i.e., a fingerprint or partial fingerprint) to the integrated biometric sensor (i.e., the HOME button with camera/scanner module). Activation of the HOME button 106 (as sensed by, e.g., the switch element 312) causes the camera/scanner module 314 to record the user's presented biometric data. Specifically, an image of the portion of the finger pressed (or swiped) against the top surface 302 of the HOME button 106 above the aperture 306 is transmitted through the aperture, focused by the lens array 318 and received by the photo sensor 320. In some embodiments, the user may be required to "swipe" his/her finger across the aperture 306 to scan a larger portion of the fingerprint; however, in other embodiments, the partial fingerprint obtained when the user simply presses his/her finger against the HOME button aperture 306 may be sufficient. The image information detected by the photo sensor 320 (and containing the user's biometric data) is transmitted via cable 322 to the sensor/security circuitry 324 of the mobile device. The sensor/security circuitry then compares the user biometric data received from the HOME button 106 to previously stored biometric data corresponding to authorized users of the mobile device. In some embodiments, such comparison may be performed entirely internally in the mobile device 100, whereas in other embodiments such comparison may be performed at least partially via communication with other networked devices, for example a central server or data repository. In some other embodiments, the technology disclosed in U.S. Pat. No. 7,519,558 to Ballard et al. may be utilized in the security system.

Referring now to FIGS. 5 and 6, there is illustrated an enlarged view of the HOME button region of another mobile device in accordance with another embodiment. Except as described below, the mobile device 500 of FIGS. 5 and 6 is substantially identical to the mobile device 100 previously described. The mobile device 500 includes a HOME button 506 having a top surface 502 and a bottom surface 504. In the illustrated embodiment, the top surface 502 has a first upwardly concave curved contour and the bottom surface 504 has a second upwardly concave curved contour; however, other curved contours, or flat contours may be used for the top and bottom surfaces of the HOME button in other embodiments. The central portion 507 of the HOME button 506 is formed of an optically transparent material (i.e., from top surface to bottom surface) so as to form a first lens 508 for transmitting optical images of the user's finger 501 through the HOME button. The optically transparent material may be a glass material, plastic material or other transparent substance. In the illustrated embodiment, the first lens 508 is circular in shape (viewed from above); however, in other embodiments, the first lens may be another shape including, but not limited to, square, round, oval, triangular or irregular.

In the illustrated embodiment, the HOME button 506 is separated from the casing 102 by a small gap 308 to allow the button to move relative to the casing; however, in other embodiments, the HOME button may be connected to the casing by a flexible continuous membrane (not shown) or other structure that allows the HOME button to move relative to the casing. The HOME button 506 is operatively connected to one or more spring element(s) 310 and one or more switch element(s) 312 disposed within the HOME button region 122 of the casing 102 to allow the HOME button to be pressed and activate functions of the mobile device 500.

A camera/scanner module 514 is disposed below the bottom surface 504 of the HOME button 506 adjacent the aperture 306 to perform user biometric sensing. In the illustrated embodiment, the camera/scanner module 514 is attached to the casing 102 so that it does not move with the HOME button 506. This mounting configuration provides a longer focal length between the first lens 508 and the camera/scanner module that may be advantageous for sensing a larger area of the user's finger 501. However, in other embodiments the camera/scanner may be mounted directly to the bottom of the HOME button. The camera/scanner module 514 includes a housing 516, a second lens 518, a photo sensor 520 and signal wires 522, which operatively connect the scanner/camera module to sensing/security circuitry 324 disposed within the casing 102 of the mobile device 500. The housing 516 and second lens 518 of the camera/scanner module 514 will be configured in accordance with the shape of the first lens 508. The lens array formed with the first and second lenses 508 and 518 may include multiple sub-elements of various optical types and powers as necessary to focus the image from the top surface 502 of the first lens to the photo sensor 520. The lenses of the lens array may further include conventional lenses of various configurations, spherical lenses, aspheric lenses, Fresnel lenses, prisms, beam-splitters, filters, polarizers and/or other optical devices useful for bending and/or focusing light. The photo sensor 520 may be a CCD light sensor, a CMOS light sensor, or other type of light sensor.

Optionally, a light source 524 may be provided in the casing 102 below the HOME button 506. The light source 524 may be an LED or other known light-emitting device. The light source may be activated at the time of scanning the user's fingerprint to provide additional light for making the image. If used for this purpose, light shielding (not shown) may be required in the casing 102 to prevent unwanted light from the light source 524 directly reaching the camera/scanner. Alternatively, the light source 524 may be activated directly before or after the actual scanning of the user's fingerprint to illuminate the HOME button 506, for example, to signal successful scanning or another status. If the light source 524 is bright enough, the emitted light will pass through the user's finger 501 and will be visible to the user even if the user's finger is covering the HOME button 506. A similar light source may be used on the HOME button 106 of mobile device 100 for such signaling purposes.

In operation of the system according to this embodiment, the user presses the HOME button 506 with his/her finger, thus presenting biometric data unique to that user (fingerprint/partial fingerprint) to the integrated biometric sensor (HOME button with camera/scanner module). Activation of the HOME button 506 causes the camera/scanner module 514 to record the user's presented biometric data. Specifically, an image of the portion of the finger pressed against the transparent top surface 502 of the HOME button 506 is transmitted through the first lens 508, focused by the first and second lens 508 and 518 and received by the photo sensor 520. In some embodiments, the light source 524 may be illuminated to provide imaging light and/or for signaling purposes. The image information detected by the photo sensor 520 containing the user's biometric data is then transmitted via cable 522 to the sensor/security circuitry 324 of the mobile device. As in the previous embodiment, the sensor/security circuitry then compares the user biometric data received from the HOME button 506 to previously stored biometric data corresponding to authorized users of the mobile device. In some embodiments, such comparison may be performed entirely internally in the mobile device 500, whereas in other embodiments such comparison may be performed at least partially via communication with other networked devices, for example a central server or data repository. In some other embodiments, the technology disclosed in U.S. Pat. No. 7,519,558 to Ballard et al. may be utilized in the security system.

Although the preferred embodiment has been described in detail, it should be understood that various changes, substitutions and alterations can be made therein without departing from the spirit and scope of the invention as defined by the appended claims.

What is claimed is:

1. A mobile device having a HOME button with integrated user biometric sensing, the mobile device comprising:
   a casing;
   a touchscreen mounted on a front side of the casing, the touchscreen acting as a display panel and, at the same time, acting as a touch-sensitive, digitizing input pad;
   a HOME button movably mounted on the front side of the casing to move relative to the casing, at least a portion of the HOME button being formed of an optically transparent material so as to form a first lens for transmitting optical images through the HOME button from a top surface to the bottom surface;

a camera/scanner module disposed below, and spaced apart from, the bottom surface of the HOME button adjacent the first lens, the camera/scanner module being attached to the casing so that it does not move with the HOME button, and the camera/scanner module including a housing, a second lens, a photo sensor and signal wires which operatively connect the scanner/camera module to sensing/security circuitry disposed within the casing;

wherein the first lens of the HOME button and the second lens of the camera/scanner module form a lens array; and wherein, when a user presses the top surface of the HOME button with a fingertip, thereby moving the HOME button relative to the camera/scanner module, the lens array focuses an image of a fingerprint of the fingertip from the top surface of the HOME button onto the photo sensor.

2. The mobile device having a HOME button with integrated user biometric sensing in accordance with claim 1, wherein the mobile device is a smartphone.

3. The mobile device having a HOME button with integrated user biometric sensing in accordance with claim 1, wherein the mobile device is a tablet device or table computer.

4. The mobile device having a HOME button with integrated user biometric sensing in accordance with claim 1, wherein the mobile device is a handheld device.

5. The mobile device having a HOME button with integrated user biometric sensing in accordance with claim 1, wherein after the lens array focuses an image of a fingerprint of the fingertip from the top surface of the HOME button onto the photo sensor, the photo sensor sends signals representative of the user's biometric data to the sensing/security circuitry of the mobile device.

6. The mobile device having a HOME button with integrated user biometric sensing in accordance with claim 5, wherein after the photo sensor sends signals representative of the user's biometric data to the sensing/security circuitry of the mobile device, the mobile device compares the user's biometric data to previously stored biometric data corresponding to on or more authorized users of the mobile device and/or accounts accessible via the mobile device.

7. The mobile device having a HOME button with integrated user biometric sensing in accordance with claim 6, wherein the comparison of the user's biometric data to previously stored biometric data corresponding to one or more authorized users is performed entirely within the mobile device.

8. The mobile device having a HOME button with integrated user biometric sensing in accordance with claim 6, wherein the comparison of the user's biometric data to previously stored biometric data corresponding to one or more authorized users is performed at least partially via communication with an external networked device.

9. The mobile device having a HOME button with integrated user biometric sensing in accordance with claim 8, wherein the external networked device is a security server.

* * * * *